United States Patent [19]

Fascenda

[11] Patent Number: 5,045,848
[45] Date of Patent: Sep. 3, 1991

[54] METHOD OF ENCODING MARKET DATA AND TRANSMITTING BY RADIO TO A PLURALITY OF RECEIVERS

[75] Inventor: Anthony C. Fascenda, Pacifica, Calif.

[73] Assignee: FNN, New York, N.Y.

[21] Appl. No.: 104,563

[22] Filed: Sep. 29, 1987

Related U.S. Application Data

[63] Continuation of Ser. No. 598,694, Apr. 10, 1984, abandoned.

[51] Int. Cl.$^5$ ............................................. H04Q 3/00
[52] U.S. Cl. ........................... 340/825.26; 340/825.27
[58] Field of Search .................. 340/825.26, 825.27, 340/825.44; 364/408; 375/7, 8; 370/43, 109, 118; 455/53, 89

[56] References Cited

U.S. PATENT DOCUMENTS

| | | | |
|---|---|---|---|
| 3,387,268 | 6/1968 | Epstein | 340/825.27 X |
| 3,611,294 | 10/1971 | O'Neill | 340/825.26 X |
| 3,716,835 | 2/1973 | Weinberg et al. | 340/825.27 |
| 4,473,824 | 9/1984 | Claytor | 340/825.27 |

Primary Examiner—Ulysses Weldon
Attorney, Agent, or Firm—Flehr, Hohbach, Test, Albritton & Herbert

[57] ABSTRACT

A method of encoding stock market data and transmitting such data via radio to a plurality of one-way receivers via an SCA channel on a commercial FM station transmits both a cyclical repetitive loop of all the stocks listed on a particular exchange including parameters of their open, high, low and last prices. During actual trading hours, the current trade values are also inserted on a real-time basis in the loop. The receiver is automatically and immediately updated by means of its storage capacity. To provide a short cycle of operation, data is compressed by dividing the stocks into groups determined by a binary offset from the last price compared to open, high and low and also by the maximum last sale price.

10 Claims, 8 Drawing Sheets

|  NAME | LAST | OPEN | HIGH | LOW | VOL | EXCHANGE | NEWS | BACKGROUND |
|---|---|---|---|---|---|---|---|---|
| R C A | 30 3/8 | -1/8 | 2 7/8 | 1 2/8 | 33-K | | | |

NYSE – SHORT

TOTAL BITS: 15 | 9 | 6 | 5 | 5 | 9 | 5 | 1 | 1
56

DISTRIBUTION: 5/5/5 | 6/3 | 1/2/3 | 2/3 | 2/3 | 7/2

```
00 = 00
-K = 01
0K = 10
-M = 11
```

BITS TRANSMITTED: 10001 | 00010 | 00000 | 01110 | 011 | 1 | 00 | 001 | 10 | 111 | 01 | 010 | 0100001 | 01

METHOD OF ENCODING MARKET DATA AND TRANSMITTING BY RADIO TO A PLURALITY OF RECEIVERS

This is a continuation, of application Ser. No. 598,694 filed Apr. 10, 1984 now abandoned.

The present invention is directed to a method of encoding stock market data and transmitting by radio to a plurality of receivers and more specifically to a method where the receivers are one-way and the data includes stock symbol, open, high and low prices as well as the current or last trading price.

Terminals for receiving stock quotations are well known in stockbroker's offices. These are two-way devices where the user inputs the stock symbol into the terminal which communicates with a central computer which then responds with various stock market data.

Radio transmission, for example, New York Stock Exchange or American Stock Exchange data has teen suggested which is equivalent to the so-called "ticker" which, of course, provides the stock symbol, the price of the last or current trade and the volume. This information occurs, of course, only when a trade is actually made. When such ticker information is received by, for example, a small portable hand-held radio receiver unit, such ticker market information is useful. But it is still limited when compared to the two-way communication available by remote terminals in a broker's office. On the other hand the flexibility of a hand-held radio receiver allows the user much greater flexibility than a wired terminal system.

Thus, it is a general object of the present invention to provide an improved method of encoding stock market data and transmitting it by radio to a plurality of receivers.

In accordance with the above object, there is provided a method of encoding stock market data including stock symbols and open, high and low prices and transmitting such data by radio to a plurality of one-way receivers comprising the following steps. During both trading and non-trading hours of a predetermined stock exchange transmitting on a repetitive cyclical basis data for all listed stocks for the exchange. Then during trading hours, inserting in such cyclical data current or last stock trades substantially as they occur and are reported. And receiving and storing a plurality of such stock data and updating such stored data with the current trade data.

From another aspect, the method also includes the step of compressing before transmission the stock market data including the steps of determining high, low and open offsets from the current or last trade price and dividing the stocks into at least two groups with a dividing line of all offsets less than $2^x$ dollars where x is integer 2 or greater. The first group below the dividing line includes the great majority of stocks. And then this first group is transmitted with offsets of $2^x$ bits.

Figure 1:
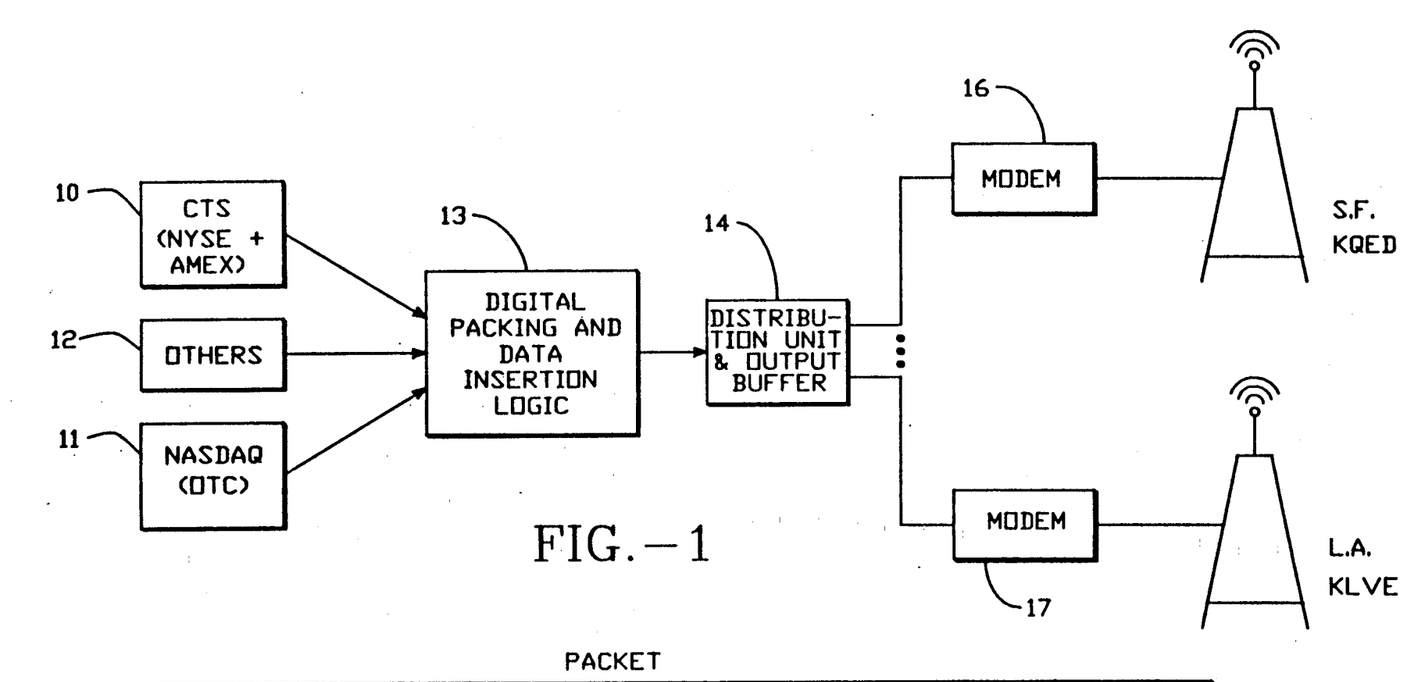
FIG. 1 is a block diagram illustrating the method of the present invention.

Now referring to FIG. 1 which is the general system layout, stock data is received from various stock exchanges which include the CTS line in block 10 which consists of the New York Stock Exchange and the American Stock Exchange, NASDAQ in block 11 which is over-the-counter and others indicated in block 12 which are commodity exchanges such as Chicago Mercantile Exchange, Commodities Exchange Corporation and Chicago Board of Trade. In addition, general information such as sports, news and specifically market news can be transmitted. All of these sources of information would be connected normally by telephone line to a central headquarters where the data would be packaged in a method in accordance with the invention as indicated by block 13.

As a typical example of the parameters being received on the CTS line 10, these would consist of the stock symbol (for example, RCA), the last or current price of the stock, the last volume and the exchange (New York or American). This information is processed along with the other inputs and in digital format is sent to the distribution unit 14 which in turn is connected by modems 16 and 17 to two or more FM radio stations for transmission of the stock market data and other information on the FM SCA subcarrier channel. The two stations indicated are San Francisco, KQED and Los Angeles, KLVE.

As will be discussed later, these radio transmissions are picked up by hand-held battery powered pocket size FM receivers which are leased by customers interested in up-to-the-minute stock market data. The configuration of the receiver which receives the data on the SCA channel of an FM station and converts it to a binary format, includes an FM receiver having an SCA phase locked loop which receives the SCA subcarrier signal and tracks it as it is swung between a plus or minus 3 KHz. The phase locked loop thus recreates the digital data which contains stock market information in the form of binary "1's" and "0's". This is coupled to a central processing unit.

The digital data is encoded for transmission via the transmitting antenna of the FM radio station by the following technique. The digital data drives a voltage controlled oscillator which in essence provides a 70 KHz signal for all binary "1's" and a 64 KHz signal for all binary "0's". This is coupled via an adder circuit to the standard 67 KHz SCA subcarrier to provide a 67 KHz signal which has been frequency shifted plus or minus 3 KHz when data is being encoded on it. Thereafter the frequency shifted subcarrier signal drives the exciter and via the transmitter transmits the data to be picked up by the receiver.

Figure 2:
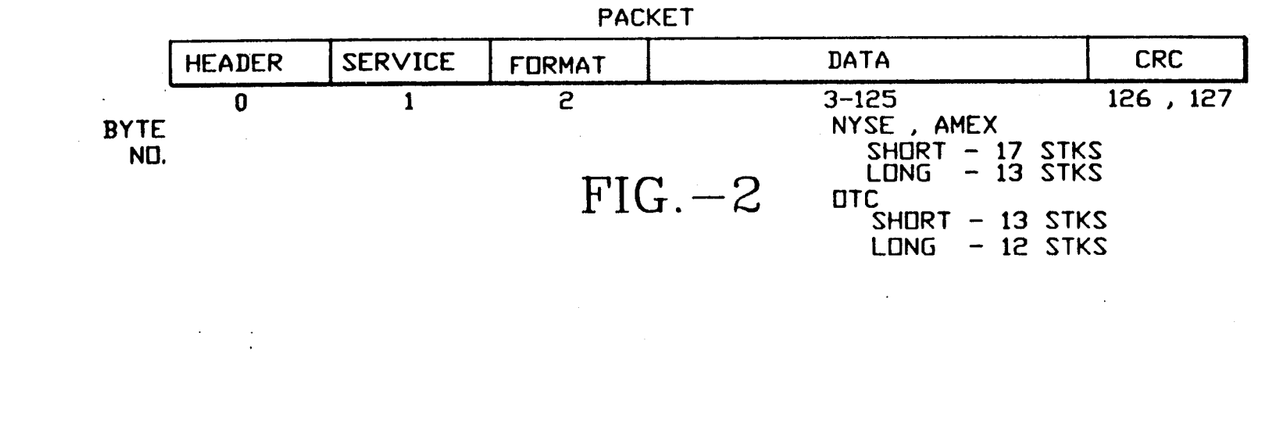
FIG. 2 shows a packet of binary stock market data illustrating how it is transmitted.

FIG. 2 illustrates the packet of digital data which is transmitted and which consists of 128 bytes, each byte having eight bits. The packet is always, in the case at least of the transmission of the New York and American Exchanges and over-the-counter, 128 bytes in length. This is transmitted at 5,000 baud asynchronously with one start bit, one stop bit with eight bytes of data and no parity. Data is binary and not in any particular type of ASCII code or any other character code. This allows compacting of the data for more efficient use of the packet structure and bandwidth.

A packet consists of the following five basic parts and these are indicated in FIG. 2 also:

1) Header—this is always $88 and indicates the beginning of the packet.
2) Service—this indicates whether it is New York Stock Exchange, American Stock Exchange, over-the-counter, commodities or general information. By means of a password supplied to the user of one of the receivers, the user has the capability of subscribing to any desired service.
3) Format—both the New York and American Exchange stocks and over-the-counter are divided into a long and a short data format. In order to limit loop transmission time, both of these formats are compressed as will be discussed below.
4) Data—the next 123 bytes (3–125) is the actual data which must all be of the same service and format. Thus, format and service cannot be mixed within a packet.
5) CRC—a cyclical redundancy check utilizes the last two bytes, 126 and 127, of the packet. This is a well-known error checking technique.

FIG. 2 also illustrates, under a preferred embodiment of the invention, the number of stocks and the data concerning such stocks which can be included in any one packet. For example, for New York and American Exchange data in a short compressed data format there may be 17 stocks and in a long format 13. For over-the-counter, a short format is 13 stocks and for a long format the packet will carry 12 stocks.

To briefly outline the method of the present invention, during both trading or non-trading hours the stocks for a particular exchange are transmitted on a repetitive cyclical basis for all the listed stocks of that exchange, for example, from A to Z. Then during trading hours, as indicated by the data insertion logic 13 of FIG. 1, (and the flow chart of FIG. 9) when a stock is traded as determined, for example, by receiving the "ticker" this is inserted into a packet and thus the data is transmitted in substantially real time. The advantage of the background loop format is that a stock will still be reported upon, even though it is not traded. But the user will get a positive indication of this by, for example, a notation on his display. In any case, if the stock, for example, was traded five minutes ago, the user will not have to wait another several minutes until the next trade is executed to receive a report on the stock. On the other hand by the data insertion technique, the most recent change will update the memory in the user's receiver.

However, because of the transmission of both the real time information and the background loop information in order to reduce the time required for one complete loop of cyclical repetition of information, data compression is of utmost necessity. Thus, it has been found that, for example, by using the so-called short format, 4,000 stocks per minute can be transmitted. This means typically a complete cycle is made in two or three minutes depending on the services required. And because of the data insertion, any stocks which are traded relatively frequently will immediately update the user's receiver.

Figure 3:
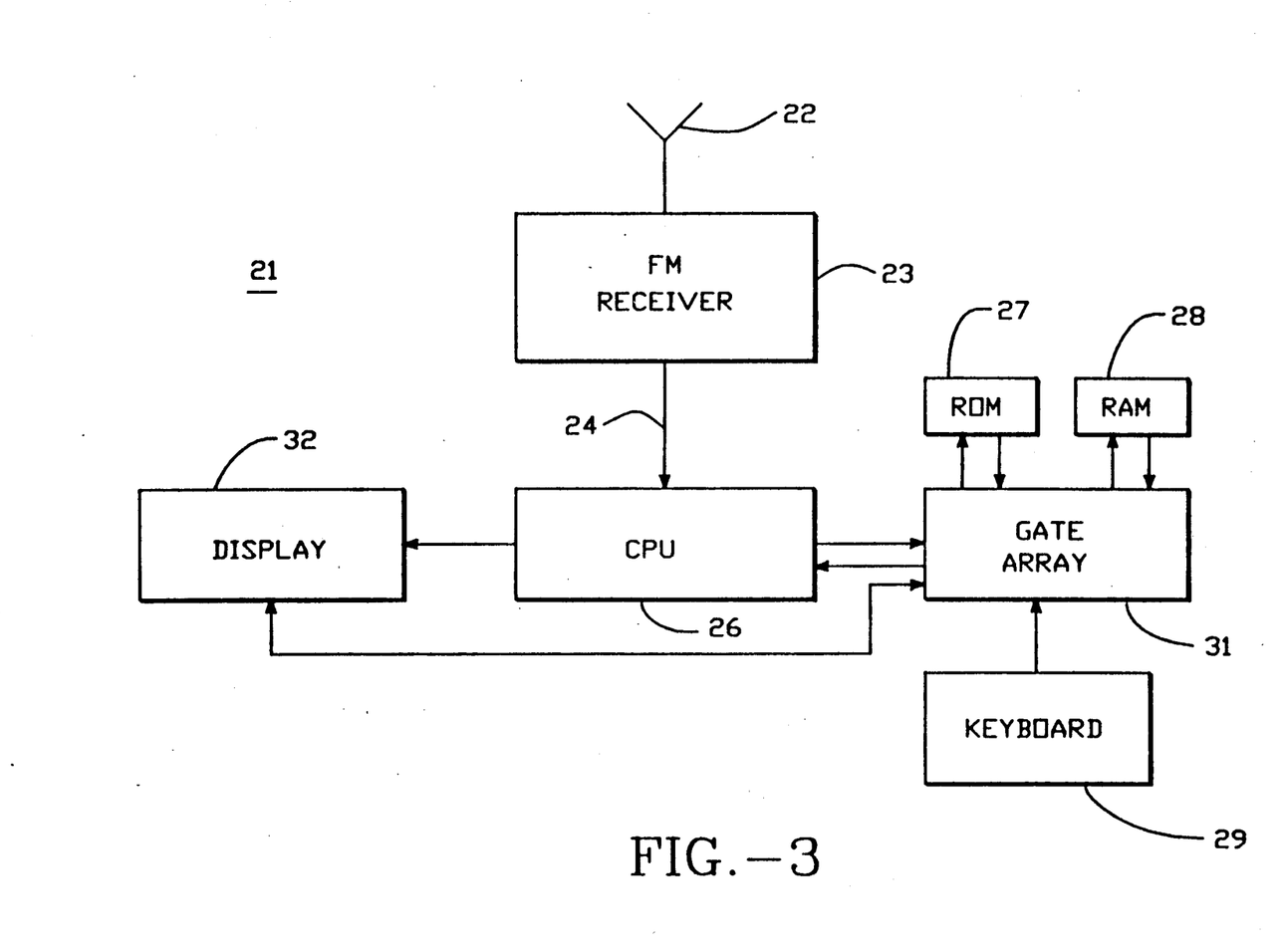
FIG. 3 is a block diagram of a receiver.

FIG. 3 illustrates the receiver unit 21 for receiving the FM signal on an antenna 22, converting it from its FM format back to digital format, and manipulating and storing the data in the hand-held receiver. This includes the FM receiver portion 23 which demodulates the data and on line 24 provides a string of digital data. The FM receiver portion 23 has already been described. Central processing unit 26 which is typically a microprocessor receives this data and manipulates it in accordance with the instructions stored in read-only memory 27. In addition in the random access memory 28, are stored a portfolio of stocks represented in the case of the New York and American Stock Exchanges by a three letter symbol or in the case of over-the-counter by a five letter symbol which the user wishes to receive. RAM 28 is stored by the means of keyboard input 29 via the gate array 31 which couples all of the above-mentioned units to the CPU 26 and a liquid crystal display 32. In addition to storing a portfolio of, for example, forty stocks which the user wishes to track, keyboard 29 allows the user to bring out of random access memory any chosen stock and the specific information for that stock.

Figure 4:
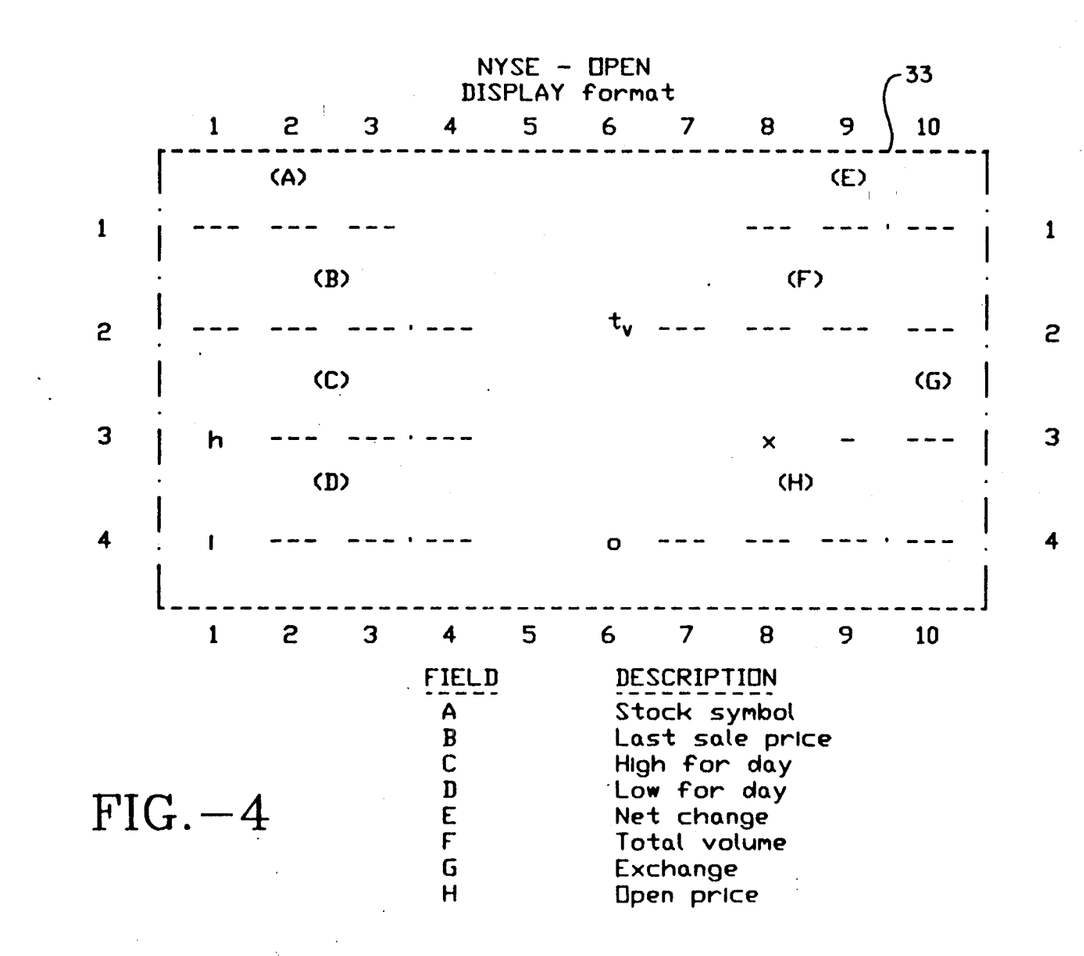
FIG. 4 shows a display format of the receiver.

This is illustrated in the display format of FIG. 4. Specifically, the display format as shown within the dashed rectangle 33 is a liquid crystal display with the fields designated A through H. The display format is typically for the New York Stock Exchange while open or trading is occurring. The fields A through F are listed as follows:

1) "A" is the stock symbol such as RCA.
2) "B" is the last or current sale price occurring during trading.
3) "C" is high for the day.
4) "D" is low for the day.
5) "E" is the net change.
6) "F" is total volume.

All of the foregoing, of course, are typical stock parameters which are also in the daily newspaper. The exchange indicator G indicates on which exchange the stock was traded. As discussed previously, the exchange the stock is listed on determines the service which is a byte of information, byte No. 1, as illustrated in FIG. 2. Finally, H is the opening price. When the stock exchanges close at the end of the day, normally the exchange indicator will have a blank character in it. This will cause the closed or non-trading format to be gone to. Thus, in the field H which is normally the open price, this will become the closed price with a small "c" rather than the "o" as indicated and the last sale price in field B will be blank. In fields C and D, the high and low will still be displayed but the net change is blank also.

Figure 5:
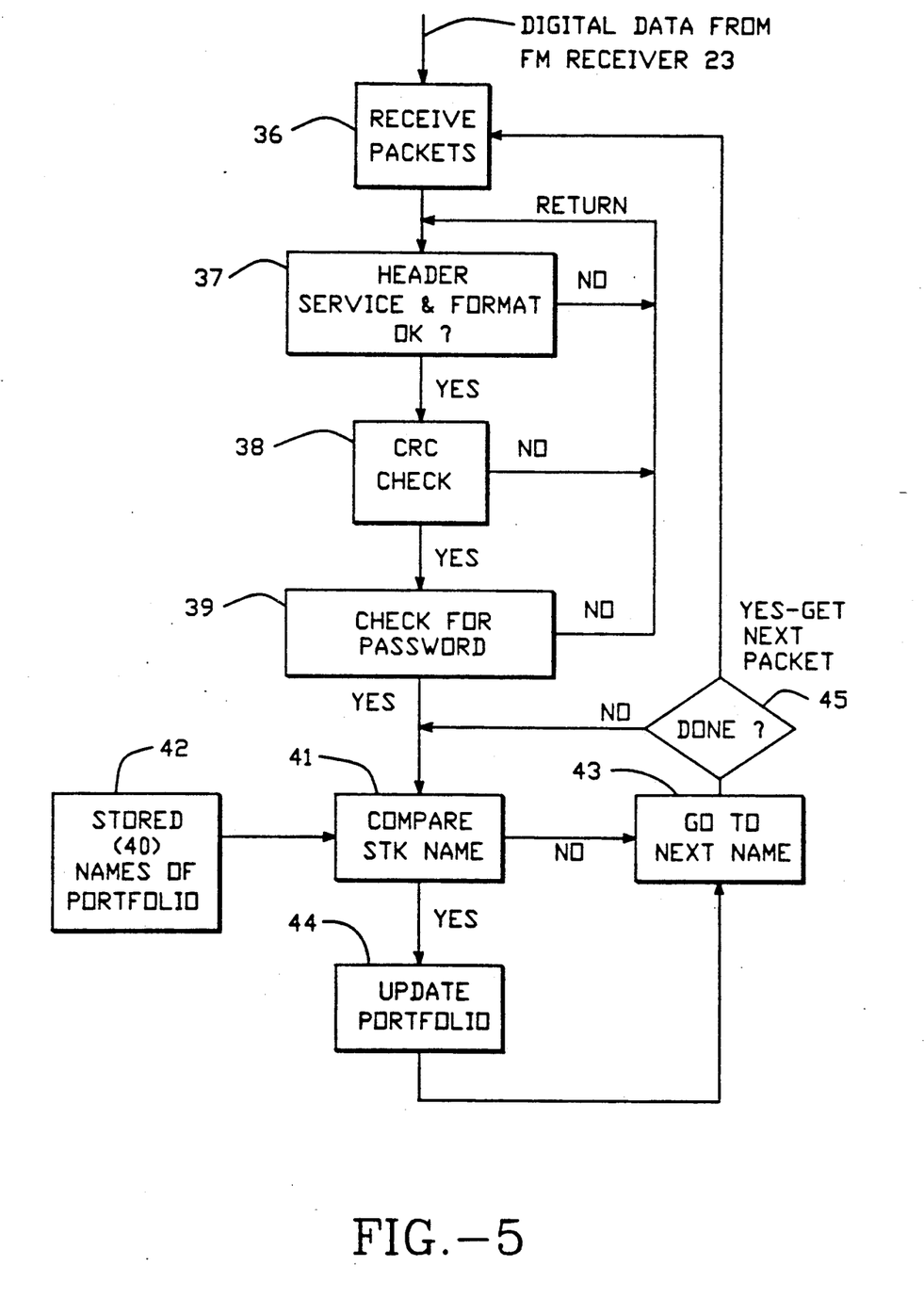
FIG. 5 is a flow chart illustrating the operation of the receiver.

FIG. 5 is a flow chart illustrating the operation of the program which is stored in the ROM 27 of the receiver of FIG. 3. The packets of information (FIG. 2) are received and the header is checked for the proper code. These are blocks 36 and 37, respectively. In addition, service and format are checked as to form to ensure that a false header has not been received. Then an error check is made in block 38 designated CRC check. And in block 39 a check is made that the password process control system has been completed. In general, as is partially discussed above, each user has their own password to determine what services have been asked for and that the user is a qualified receiver. If this is okayed, then as indicated in block 41, the stock names which are in the packet are compared with the stored names of the portfolio indicated at block 42. These would be stored by the user as shown in FIG. 3 by the use of the keyboard 29 in the RAM 28. If there is no comparison, then the next name is received as indicated by block 43. If there is a comparison, then all of the stock data parameters being transmitted and associated with that name update the stock portfolio 42 as indicated by the block 44. Step 45 signals the end of a packet and the next packet is then processed. If at the time of an update the stock and its parameters are displayed on the liquid crystal display 32 (FIG. 3), this display will be automatically changed. In this manner, rapidly changing stocks may be evaluated on a real-time basis by the user.

Figure 6:
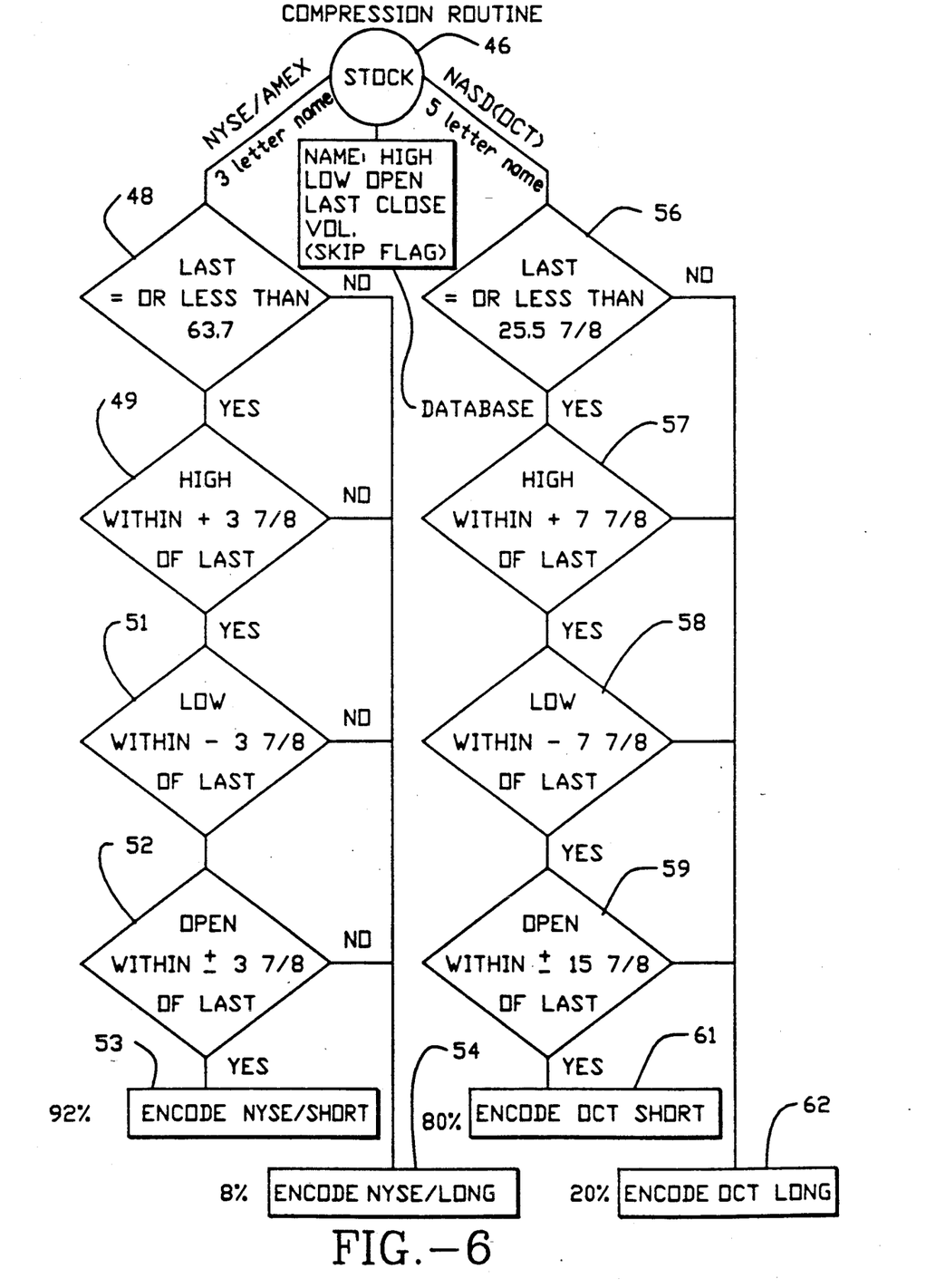
FIG. 6 is a flow chart showing the compression of data.

FIG. 6 illustrates the compression routine which is accomplished by the digital packing logic 13 of FIG. 1. Stock data received from either CTS or NASDAQ is indicated at the circle 46 and splits into either a New York American-branch or over-the-counter branch. In the former branch, it is, of course, a three letter name and over-the-counter is a five letter name. The stock information which is received is stored by the main data processor 13 in FIG. 1 and as shown in database block 47. High, low and open data is stored as well as last, close, volume and a "skip flag". This is because as discussed above the "ticker" only provides during operation the stock symbol, the last trade price and volume. In any case to determine whether the compression format of the stock is to be short, long or for that matter to be transmitted as just general data, the following four checks are made:

1) In block 48, the last sale price must be equal or less than 63.7 dollars. Thus, to transmit the price in binary, means a field of 6 bits: $2^6$ equals 64.

Then the next three checks are whether the high is within plus $3\frac{7}{8}$ of the last trade, block 49, low is within a minus $3\frac{7}{8}$ of the last trade, block 51, and the open is within plus or minus $3\frac{7}{8}$ of the last block 52. If all of these questions are answered in the affirmative, then block 53 indicating encode New York Stock Exchange short is gone to. If any one of the questions receives a no answer, then the stock is encoded as indicated by block 54 in a long format.

An important concept of the invention is transmitting high, low and open data as an offset to the last stock trade. Thus, the number of bits for a particular field to represent the number is significantly reduced. Another choice that has been made as indicated in block 48 is to choose an absolute value of stock price which would be represented in a binary format which covers the great majority of the stocks for that particular exchange but will conveniently fit in a minimum bit field in this case 6 bits or 2 to 6th power. Thus, the dividing line between this group of stocks which fit into the classification illustrated in FIG. 6 has been chosen to include the great majority of the stocks; for example, with the present values it has been found that 92 percent will be included leaving only 8 percent in the remaining long format or in extreme cases just transmitted as typical binary data in a straight format. Of course with change in price level due to inflation or deflation, the dividing line would be adjusted.

Similarly, with respect to over-the-counter stocks which, of course, include a far larger range of types of stocks, the dividing line here is as indicated in block 56 for a stock price equal or less than 255 and $\frac{7}{8}$ dollars or 2 to the 8th power. And then the offsets for high and low blocks 57, 58 have been found to be most conveniently less than 8 dollars or 2 to the 3rd power. In other words, this offset information will consume 3 bits of the space in a packet when transmitted (excluding the fraction). Finally, the open offset, block 59, is less than 16 dollars or 2 to the 4th power. With this type of grouping, see block 61 indicating encode over-the-counter short format, it has been shown to constitute 80 percent of the over-the-counter stocks with the remaining illustrated by block 62 as 20 percent.

Figure 7:
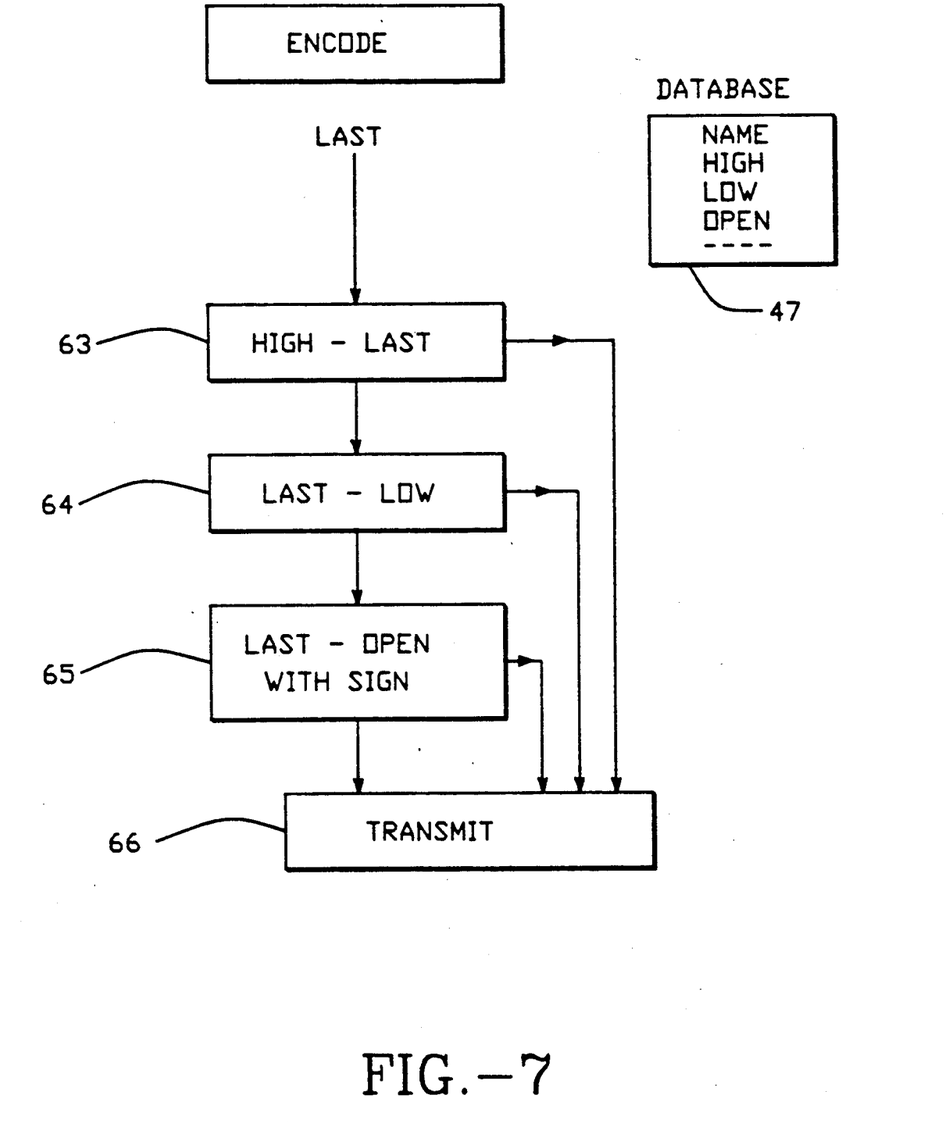
FIG. 7 is a flow chart which is a continuation of FIG. 6.

FIG. 7 indicates the completion of the reformatting or compressing of the data and shows the specific flow chart for the last details of the encode process in blocks 53, 54, 61 and 62 of FIG. 6. Here the last sale price in block 63 is subtracted from high, in block 64 the low is subtracted from the last sale price and in block 65 the open is subtracted from the last with the addition of a sign which in actuality shows the net change of the stock. All of these offset numbers are then transmitted as indicated by block 66. As indicated by block 47, of course, the main logic computer 13 of FIG. 1 has stored the high, low and open of the stocks to make the proper computations.

Figure 8:
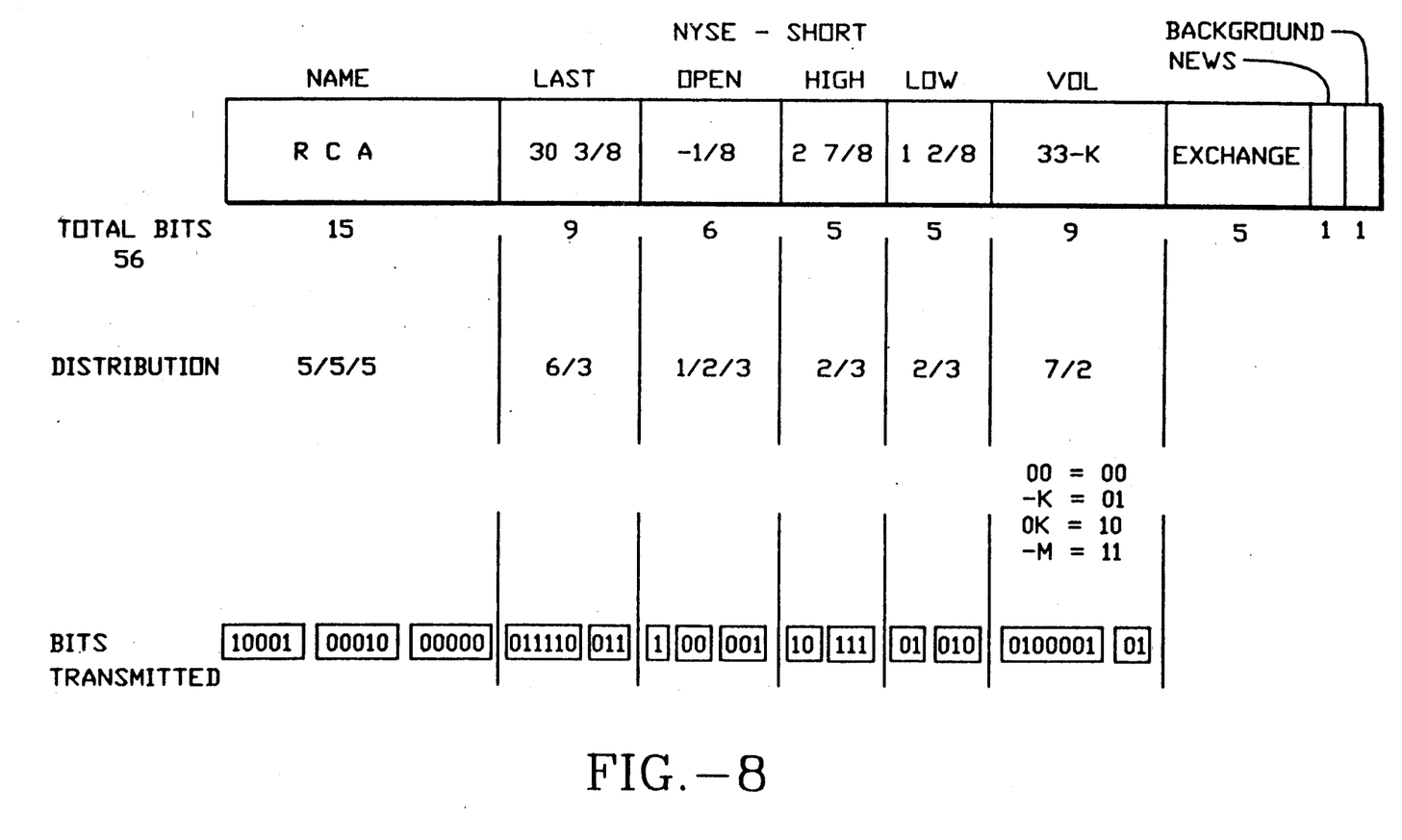
FIG. 8 shows the unit structure of the packet of FIG. 2.

FIG. 8 illustrates the foregoing data compression technique for a New York Stock Exchange short format and in fact also for an American Stock Exchange short format. The example illustrated is of the stock with the symbol RCA. FIG. 8 in essence shows the unit structure of the packet illustrated in FIG. 2 and in the case of New York Stock Exchange short would be one of the 17 stocks contained in a packet. The total bits in a packet is 56 meaning 7 bytes. Thus, with 17 stocks in a New York Stock Exchange short packet, the data field of the packet will have 4 bytes left over.

Referring in detail to FIG. 8, the packet unit structure for RCA includes in conformance with FIGS. 6 and 7 the last or current sale price illustrated as 30 and $\frac{7}{8}$, the open, high and low offsets as computed in FIG. 7, and the volume indicated as 33K or thousand shares. The remaining information includes the exchange symbol and one bit indicators whether news concerning the stock symbol is pending. The background bit is "1" if the trade has just occurred in substantially real time or is zero to indicate that it is older information which is taken from the cyclically repeating loop of stocks. The number of bits for each parameter is indicated below that parameter and totals 56. And then below that is the distribution of bits to various portions of the parameter. Finally, the actual bits transmitted for the specific parameter is indicated.

Very specifically, the stock symbol RCA uses a 5 bit binary code for each letter for the 26 letters in the alphabet; e.g., A is all zeros as indicated in FIG. 8 and so on with 26 letters corresponding numerically 0 through 25. Thus, the complicated and larger character array of ASCII is avoided.

Next, the last sale price in the short format can be represented by 6 bits for the whole number which means numbers equal or less than 64 and then the fraction is a 3 bit binary number. Thus, the 8ths from 0 through 7 correspond directly to the equivalent number of the 3 bit code. The open offset is signed and thus there is an extra one bit indicator for the negative sign. The remainder of the offsets, high and low, are all 2 bit for the numbers 1, 2, 3 and a 3 bits are allocated for the 8ths indication.

Volume uses a 7 bit binary code to indicate 0 through 99. Then the multiplier is as indicated a 2 bit multiplier which adds hundreds, thousands, ten thousands or millions.

The present compressed or packed format for data is received and stored in the receiver of FIG. 3 in that format. However, when this data is to be displayed, the program which is stored in the receiver unpacks it, in essence reversing the process of the flow chart of FIG. 7, which, for example, adds the high offset of $2\frac{7}{8}$ to last so that the high will be indicated as 33 2/8; the low will be subtracted indicating a low of 29⅛; the open will be added to indicate an open of 30 4/8. Net change is the actual open offset. These numbers are displayed in the display format of FIG. 4.

Thus far only the data compression for a New York Stock Exchange short format which utilizes 56 bits has been described. With a long format, it has been found suitable to use 10 bits or less than 1,024 dollars for the last stock trade and to increase the offsets to 6 bits or less than 64 dollars. This will consume 72 bits of space. In the case of over-the-counter stocks, in both short and long formats, 25 bits because of the five letter symbol must be used compared to 15. And then for a short format the less than 256 dollar last sale consumes 8 bits, high low offsets of less than 8 dollars, 3 bits (as indicated in FIG. 6), and then an open of less than 16 consumes 4. This is a 72 bit field.

Finally, for the long over-the-counter format, 11 bits or 2,048 dollars are used for the last sale price, offsets of less than 32 dollars for high, low and open meaning 5 bits to total 80 bits.

Thus, referring back to FIG. 2, the foregoing explains the difference in the number of stocks which can be contained in the standard data packet; with New York Stock Exchange and American Stock Exchange in short and long format; being able to transmit 17 and 13 stocks, respectively, and over-the-counter short and long 13 and 12 stocks, respectively.

Figure 9:
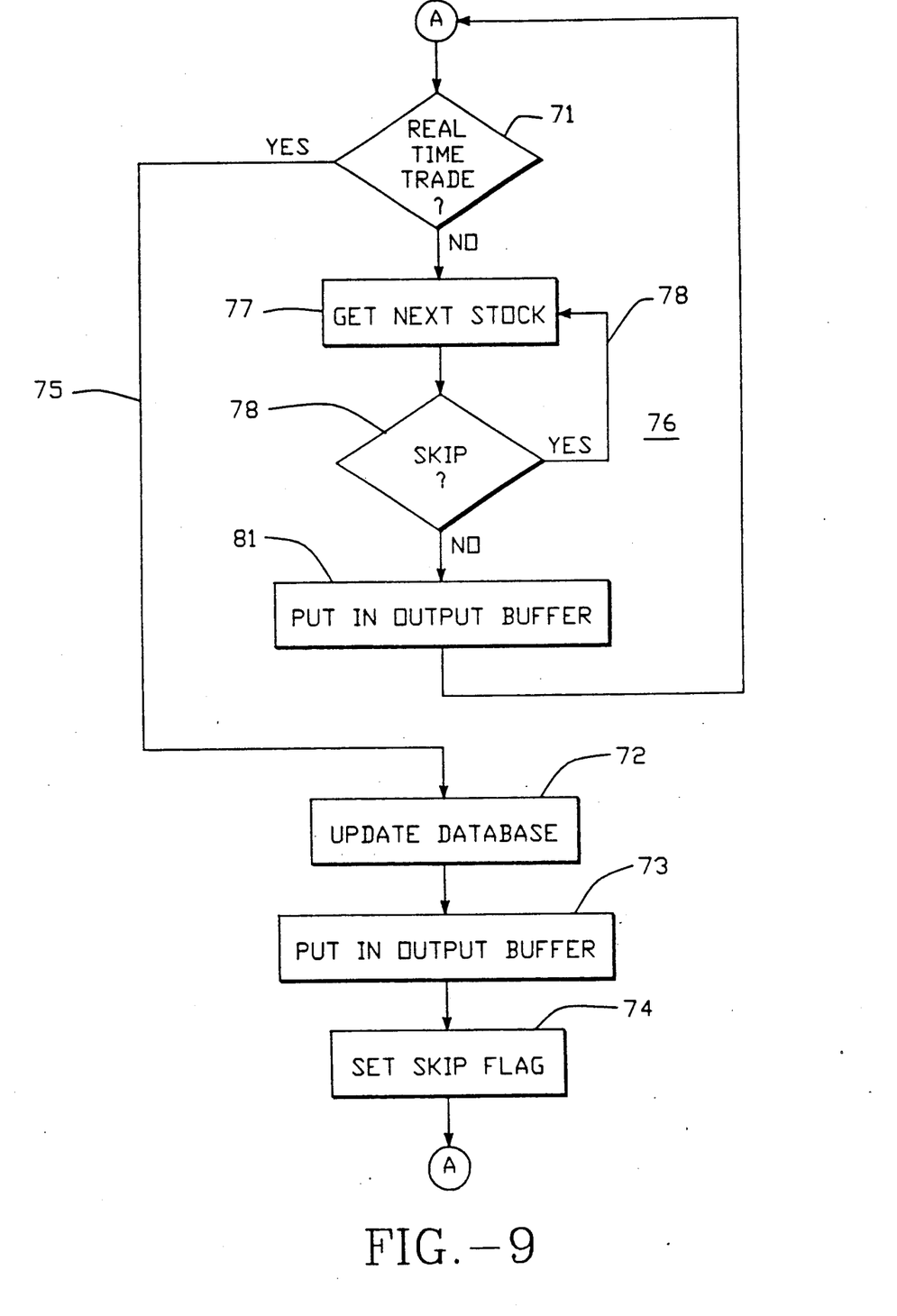
FIG. 9 is a flow chart showing real time data insertion.

FIG. 9 illustrates the real-time data insertion flow chart which, briefly referring to FIG. 1, is being accomplished by the central computer 13. As discussed above, the system of the present invention will process 7,000 securities from seven major exchanges in a two and one-half minute loop. When the market is closed, the stock database 47 (FIGS. 6 and 7) which is arranged alphabetically from A to Z and which is part of the central computer 13, is transmitted over and over again in a repetitive cycle or loop. Specifically, the information is read out and placed in compressed format from database 47 (FIG. 6) and then outputted via the output buffer 14. However, when the market is open and real-time trading occurs, while the background loop is maintained, the real-time trades are immediately mixed and inserted with the background database information. However, in order to preserve a minimum loop time, when a real-time insertion is made the information for that particular stock will be skipped on the next pass of the background readout. Of course, in accordance with the discussion of FIG. 6, the background database 47 is immediately updated upon receipt of the real-time trade information for that particular stock. Thus, to repeat that trade in a single loop would be somewhat redundant.

The specific technique is illustrated in FIG. 9 where the question is asked in block 71—is there a real time trade—. If so, as discussed above, a branch 75 is made and in block 72 database 47 is updated. The particular stock is then put in the output buffer 73 and, of course, transmitted. Most importantly in step 74, a skip flag is set, and memory is provided in the database 47 as indicated in FIG. 6. This indicates that the stock will be skipped on the next pass of the background readout; in other words, when a real-time stock trade has previously occurred.

Such background readout is shown in FIG. 9 by the loop 76. Specifically, in decision block 71 if there is no real-time trade goes to block 77 and gets the next stock out of database 47. If there is a flag bit for skipping, as indicated by decision block 78, this stock is skipped and by return loop 79 the next stock is gotten. If there is no skip flag set, then in block 81 the stock is put in the output buffer and a return made to point A to determine whether or not there is another real-time trade. Thus, the background readout is determined by loop 76 which occurs without interruption, for example, when the market is closed. However, when the market is open, then the branch 75 is gone to and the database is updated and the skip flag set.

Thus, if the stock trades five times during a loop transmission, the database record for that stock will be updated five times and the stock transaction will be placed in the output buffer five times and then skipped once during the next background readout. Therefore, this provides the user both on-line "ticker" information which is undelayed at the same time maintaining the background database for both market closed situations and when the stock is not frequently traded.

Thus, in summary, an improved method of encoding stock market data and transmitting it by radio to a plurality of receivers has been provided.

What is claimed is:

1. A method of transmitting stock market data for the listed stocks of at least one stock exchange including stock symbol, and last, open, high and low prices and transmitting such data in the form of bits via radio to a plurality of one way receivers comprising the following steps:

encoding said stock data before transmission to limit the number of said bits;

said encoding includes the steps of selecting a group of stocks of a said exchange having last prices less than $64 or $2$^x$ where x is an integer 6 or greater and having offsets of less than $4 or $2$^y$ where y is an integer 2 or greater, said offsets including the transmitting to said receivers on a repetitive cyclical basis said data for all listed stocks of said exchange in a single cycle;

during trading hours of a predetermined stock exchange inserting in said cylindrical data said last stock prices substantially as they occur and are reported during transmission of a cycle of said cyclical data;

receiving via radio and storing in said receiver stock data, transmitted on said cyclical basis, for selected stocks and updating during trading hours said stored data with said inserted data being received;

and immediately displaying, in response to the command of a user of said one-way receiver, a said last stock price of a predetermined said listed stock which is the result of sale of said stock having just occurred in time or having occurred previously, which ever is the case.

2. A method as in claim 1 where volume data is encoded by a binary 0-99 code and a 2 bit code for additional orders of magnitude.

3. A method as in claim 1 where said data is stored by said receiver in said encoded format and including the steps of processing said data for display only.

4. A method as in claim 1 where said selection includes the majority of said listed stocks of said exchange.

5. A method as in claim 1 where said last price is in pure binary except for the fraction.

6. A method as in claim 1 where said open offset includes a sign bit.

7. A method as in claim 1 where the eighths of both said last stock prices and said offsets are represented by a 3 bit code.

8. A method of transmitting in the form of bits stock market data for the listed stocks of at least one stock exchange including stock symbol, and last, open, high and low prices and transmitting such data via radio to a plurality of one-way receivers comprising the following steps:

encoding before transmission said stock market data by limiting the number of said bits including the steps of determining high, low, and open offsets from the last price, said offsets including the difference between low, open and high prices with respect to said last price, and dividing said stocks into at least two groups with a dividing line of all offsets less than $\$2^y$ where y is an integer 2 or greater such first group below said dividing line including the majority of listed stocks of said exchange;

and transmitting via radio said high, low and open prices of said first group of stocks to said receivers with offsets of y bits.

9. A method as in claim 8 where said dividing line includes said last price of less than $\$2^x$ where x is an integer 6 or greater and where said last price of the group below said dividing line, is transmitted by x bits.

10. A method of transmitting stock market data for the listed stocks of at least one stock exchange including stock symbol, and last, open, high and low prices and transmitting such data via radio to a plurality of one way receivers comprising the following steps:

transmitting to said receivers on a repetitive cyclical basis said data for all listed stocks of said exchange in a single cycle;

during trading hours of a predetermined stock exchange inserting in said cyclical data said last stock prices substantially as they occur and are reported during transmission of a cycle of said cyclical data;

receiving via radio and storing in said receiver stock data, transmitted on said cyclical basis, for selected stocks and updating during trading hours said stored data with said inserted data being received;

skipping said repetitive cyclic transmission of a stock when at least stock price of such stock has previously been inserted in said cycle;

and immediately displaying, in response to the command of a user of said one-way receiver, a said last stock price of a predetermined said listed stock which is the result of sale of said stock having just occurred in time or having occurred previously, which ever is the case.

* * * * *